United States Patent
Seigler

(10) Patent No.: US 8,437,229 B2
(45) Date of Patent: May 7, 2013

(54) TRANSDUCER ASSEMBLY HAVING GRATING SLITS PARALLEL TO LONGITUDINAL AXIS OF WAVEGUIDE

(75) Inventor: Michael Allen Seigler, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 373 days.

(21) Appl. No.: 12/840,371

(22) Filed: Jul. 21, 2010

(65) Prior Publication Data

US 2012/0020195 A1 Jan. 26, 2012

(51) Int. Cl.
*G11B 11/00* (2006.01)
(52) U.S. Cl.
USPC .................................... 369/13.33; 369/13.13
(58) Field of Classification Search ............... 369/13.13, 369/13.33, 13.32, 13.02, 112.09, 112.14, 369/112.21, 112.27, 300; 360/59; 385/129, 385/31, 88–94; 29/603.07–603.27
See application file for complete search history.

(56) References Cited

U.S. PATENT DOCUMENTS

| | | | |
|---|---|---|---|
| 6,944,112 B2 | 9/2005 | Challener | |
| 6,963,530 B1 | 11/2005 | Thornton et al. | |
| 7,412,143 B2 * | 8/2008 | Rottmayer et al. | 385/129 |
| 7,596,072 B2 * | 9/2009 | Buechel et al. | 369/13.33 |
| 7,609,480 B2 | 10/2009 | Shukh et al. | |
| 7,643,248 B2 | 1/2010 | Sluzewski | |
| 2004/0001420 A1 | 1/2004 | Challener | |
| 2004/0081031 A1 | 4/2004 | Saga et al. | |
| 2007/0081427 A1 | 4/2007 | Suh et al. | |
| 2007/0159720 A1 | 7/2007 | Sohn et al. | |
| 2009/0073858 A1 | 3/2009 | Seigler et al. | |
| 2009/0208171 A1 | 8/2009 | Gage et al. | |
| 2011/0217003 A1 * | 9/2011 | Gage et al. | 385/30 |
| 2011/0235480 A1 * | 9/2011 | Goulakov et al. | 369/13.33 |
| 2012/0002318 A1 * | 1/2012 | Seigler | 369/13.33 |
| 2012/0057440 A1 * | 3/2012 | Challener et al. | 369/13.33 |
| 2012/0163138 A1 * | 6/2012 | Gage et al. | 369/13.13 |

* cited by examiner

*Primary Examiner* — Tan X Dinh
(74) *Attorney, Agent, or Firm* — Hollingsworth Davis, LLC

(57) ABSTRACT

An apparatus having a transducer assembly that includes a waveguide having first and second cladding layers and a core layer between the first and second cladding layers, and a grating structured to couple electromagnetic radiation into the waveguide. The grating has a plurality of elongated slits that are substantially parallel to a longitudinal axis of the waveguide. The apparatus further has a light source mounted adjacent the waveguide to direct light onto the grating.

20 Claims, 5 Drawing Sheets

TRANSDUCER ASSEMBLY HAVING GRATING SLITS PARALLEL TO LONGITUDINAL AXIS OF WAVEGUIDE

BACKGROUND

Heat assisted magnetic recording (HAMR) generally refers to the concept of locally heating recording media to reduce the coercivity of the media so that the applied magnetic writing field can more easily direct the magnetization of the media during the temporary magnetic softening of the media caused by the heat source. A tightly confined, high power laser light spot is used to heat a portion of the recording media to substantially reduce the coercivity of the heated portion. Then the heated portion is subjected to a magnetic field that sets the direction of magnetization of the heated portion. In this manner the coercivity of the media at ambient temperature can be much higher than the coercivity during recording, thereby enabling stability of the recorded bits at much higher storage densities and with much smaller bit cells.

One arrangement for directing light onto recording media uses a planar solid immersion mirror (PSIM), or lens, fabricated on a planar waveguide; and a near-field transducer (NFT), in the form of an isolated metallic nanostructure, placed near the PSIM focus. The near-field transducer is designed to reach a local surface plasmon (LSP) condition at a designated light wavelength. At LSP, a high field surrounding the near-field transducer appears, due to collective oscillation of electrons in the metal. Part of the field will tunnel into an adjacent media and get absorbed, raising the temperature of the media locally for recording. However, there is a continued need to improve such arrangements to be able to deliver sufficiently high levels of optical radiation to the HAMR head in order to provide rapid heating of magnetic media.

SUMMARY

An aspect of the present invention is to provide an apparatus having a transducer assembly that includes a waveguide having first and second cladding layers and a core layer between the first and second cladding layers, and a grating structured to couple electromagnetic radiation into the waveguide. The grating has a plurality of elongated slits that are substantially parallel to a longitudinal axis of the waveguide. The apparatus further has a light source mounted adjacent the waveguide to direct light onto the grating.

These and various other features and advantages will be apparent from a reading of the following detailed description.

DRAWINGS

DETAILED DESCRIPTION

Figure 1:
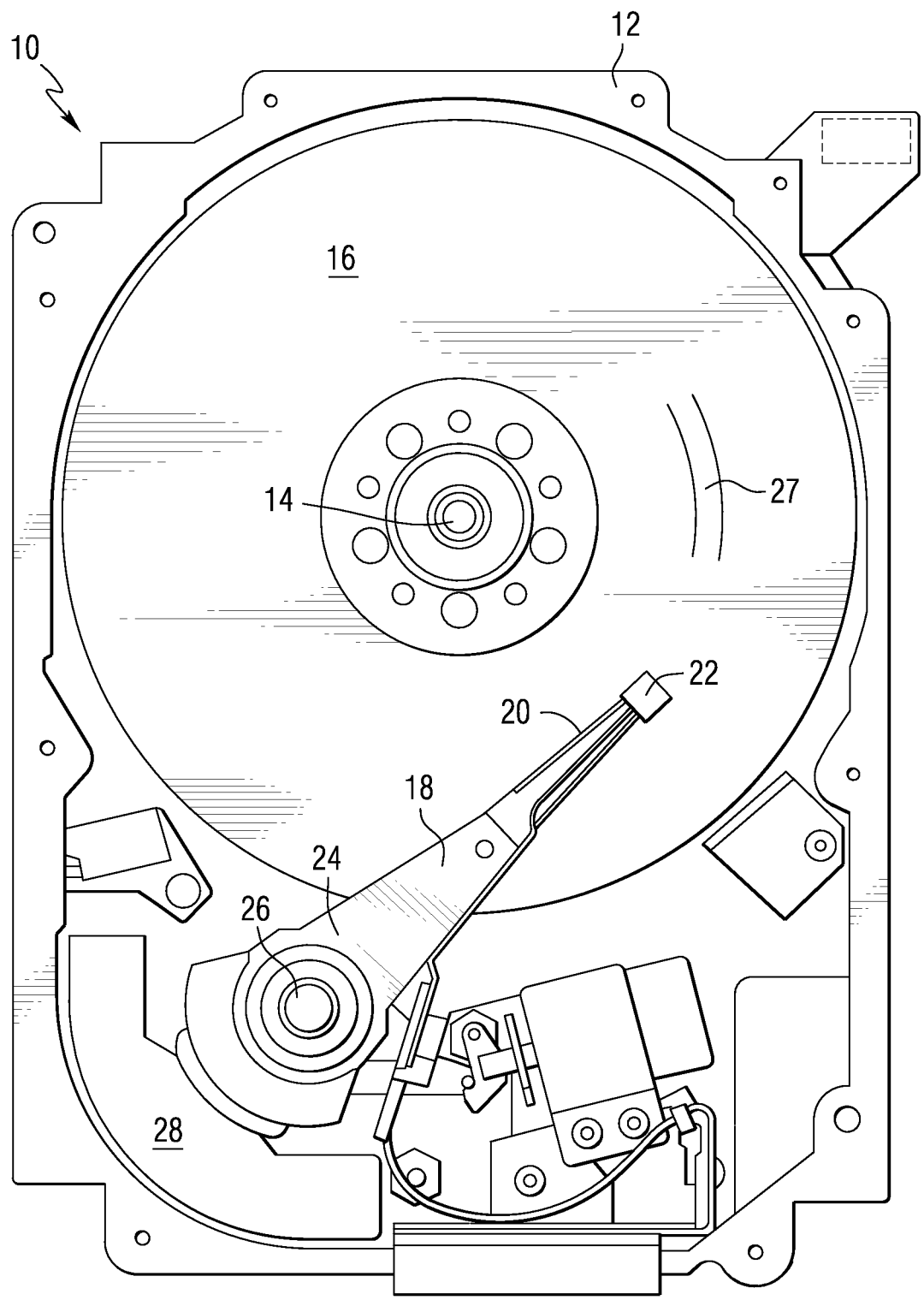
FIG. 1 is a pictorial representation of a data storage device in the form of a disc drive that can include a transducer, in accordance with an aspect of the invention.

FIG. 1 is a pictorial representation of a data storage device in the form of a disc drive 10 that can utilize a transducer assembly constructed in accordance with an aspect of the invention. The disc drive 10 includes a housing 12 (with the upper portion removed and the lower portion visible in this view) sized and configured to contain the various components of the disc drive. The disc drive 10 includes a spindle motor 14 for rotating at least one magnetic recording media 16 within the housing. At least one arm 18 is contained within the housing 12, with each arm 18 having a first end 20 with a recording head or slider 22, and a second end 24 pivotally mounted on a shaft by a bearing 26. An actuator motor 28 is located at the arm's second end 24 for pivoting the arm 18 to position the recording head 22 over a desired track 27 of the disc 16. The actuator motor 28 is regulated by a controller, which is not shown in this view and is well-known in the art.

For heat assisted magnetic recording (HAMR), an electromagnetic wave of, for example, visible, infrared or ultraviolet light is directed onto a surface of a data storage medium to raise the temperature of a localized area of the medium to facilitate switching of the magnetization of the area. Recent designs of HAMR recording heads include a transducer assembly having a thin film waveguide on a slider to guide light to the storage medium for localized heating of the storage medium. To launch light into the waveguide, the transducer assembly can use a grating coupler in cooperation with the waveguide.

Figure 2:
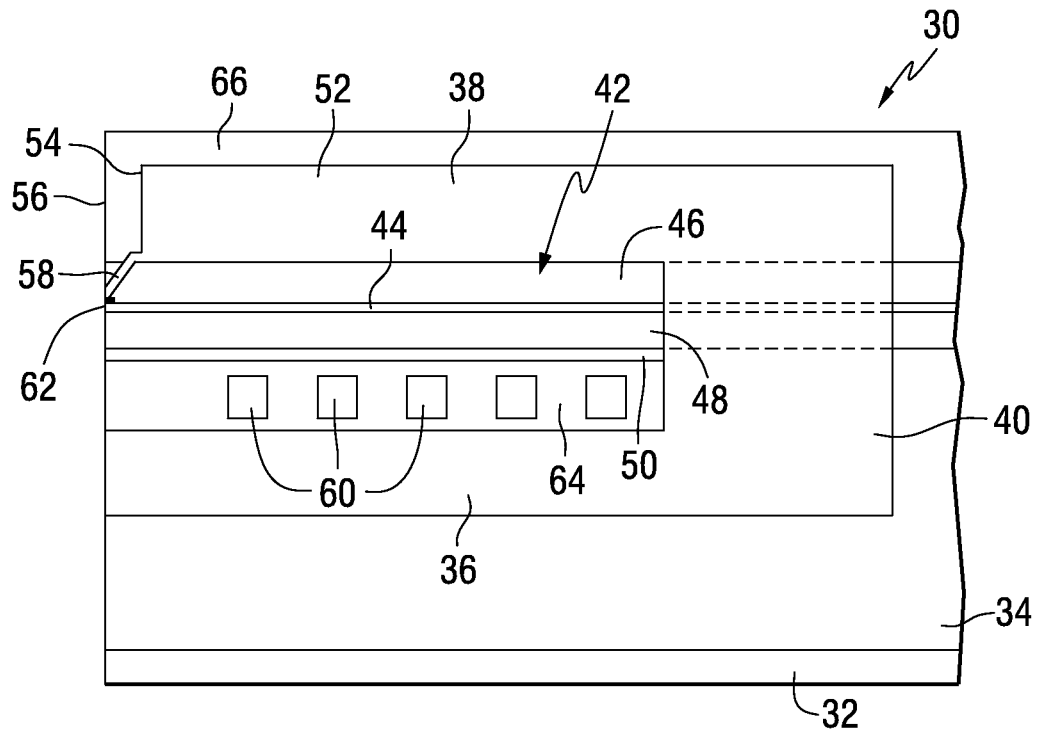
FIG. 2 is a cross-sectional view of a recording head, in accordance with an aspect of the invention.

FIG. 2 is a cross-sectional view of an example of a recording head for use in HAMR, in accordance with an aspect of this invention. The recording head 30 includes a substrate 32, a base coat 34 on the substrate, a bottom pole 36 on the base coat, and a top pole 38 that is magnetically coupled to the bottom pole through a yoke or pedestal 40. A waveguide 42 is positioned between the top and bottom poles. The waveguide includes a core layer 44 and cladding layers 46 and 48 on opposite sides of the core layer 44. A mirror 50 may be positioned adjacent to one of the cladding layers. The top pole 38 is a two-piece pole that includes a first portion, or pole body 52, having a first end 54 that is spaced from the air bearing surface 56, and a second portion, or sloped pole piece 58, extending from the first portion and tilted in a direction toward the bottom pole 36. The second portion 58 is structured to include an end adjacent to the air bearing surface 56 of the recording head, with the end being closer to the waveguide than the first portion of the top pole. A planar coil 60 also extends between the top and bottom poles and around the pedestal. A near-field transducer (NFT) 62 is positioned in the cladding layer 46 adjacent to the air bearing surface. An insulating material 64 separates the coil turns. Another layer of insulating material 66 is positioned adjacent to the top pole.

Figure 3:
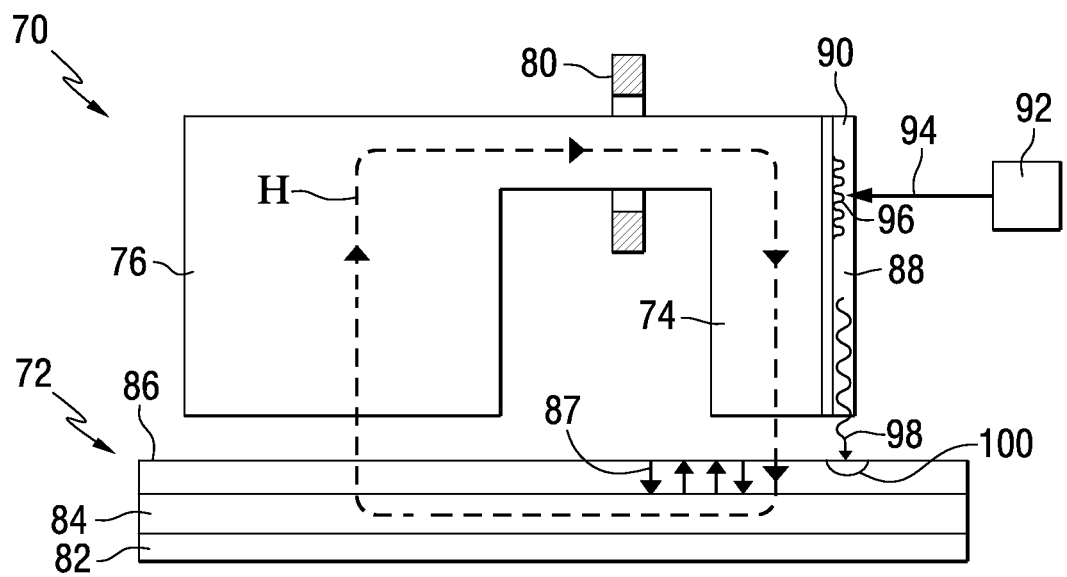
FIG. 3 is a schematic representation of a recording head and a storage medium, in accordance with an aspect of the invention.

FIG. 3 is a schematic representation of a HAMR head 70 that includes an optical transducer, in combination with a magnetic recording medium 72, in accordance with an aspect of this invention. The recording head 70 in this example includes a writer section comprising a main write pole 74 and a return or opposing pole 76 that are magnetically coupled by a yoke or pedestal extending therebetween. A magnetization coil 80 surrounds the yoke or pedestal for energizing the recording head 70. The recording head 70 may also include a read head, not shown, which may be any conventional type of read head, as is generally known in the art.

The recording medium 72 is positioned adjacent to or under the recording head 70. The recording medium 72 includes a substrate 82, which may be made of any suitable material such as ceramic glass or amorphous glass. A soft magnetic underlayer 84 is deposited on the substrate 82. The soft magnetic underlayer 84 may be made of any suitable material such as, for example, alloys or multilayers of Co, Fe, Ni, Pd, Pt or Ru. A hard magnetic recording layer 86 is deposited on the soft underlayer 84, with the perpendicular oriented magnetic domains 87 contained in the hard recording layer 86. Suitable hard magnetic materials for the hard magnetic recording layer 86 may include at least one material selected from, for example, FePt or CoCrPt alloys having a relatively high anisotropy at ambient temperature.

The recording head 70 also includes a planar waveguide 88 that directs light received from a light source 92 onto a surface of the recording medium 72 to heat the recording medium 72 proximate to where the write pole 74 applies the magnetic write field H to the recording medium 72. The planar waveguide 88 includes a light transmitting layer 90. The optical waveguide 88 acts in association with the light source 92 which transmits light, for example via an optical path 94. The light is coupled to the optical waveguide 88, by a coupling means such as a grating 96. The light source 92 may be, for example, a Vertical Cavity Surface Emitting Laser (herein "VCSEL"), a laser diode, or other suitable source of electromagnetic (EM) radiation. This provides for the generation of a guided mode that propagates through the optical waveguide 88 toward the recording medium. EM radiation, generally designated by reference number 98, is transmitted from the waveguide 88 for heating the recording medium 72, and particularly for heating a localized area 100 of the recording layer 86. Although FIG. 3 shows a perpendicular magnetic recording head and a perpendicular magnetic recording medium, it will be appreciated that the invention may also be used in conjunction with other types of recording heads and/or recording mediums where it may be desirable to employ heat assisted recording.

Figure 4:
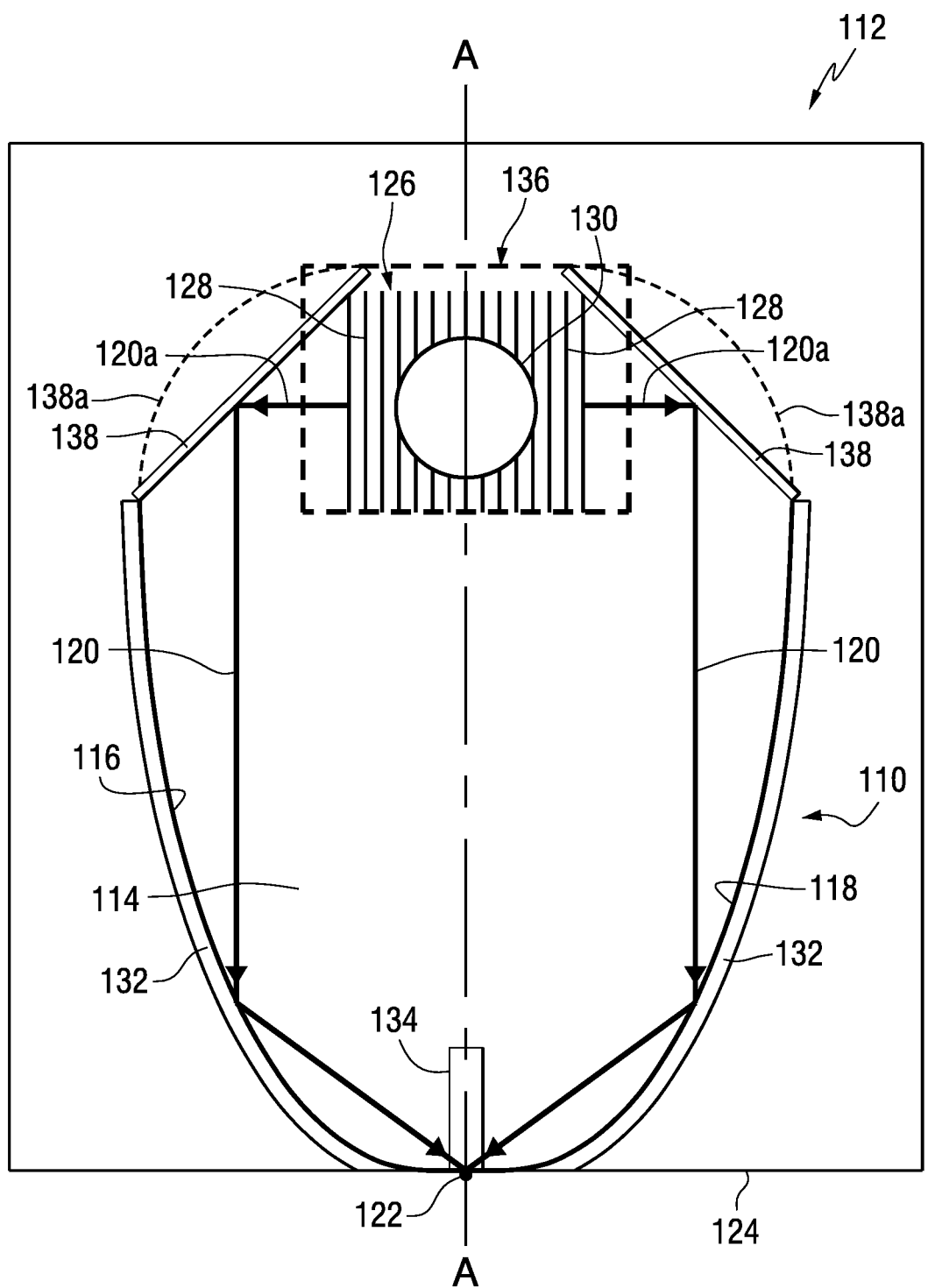
FIG. 4 is an elevation view of a waveguide in a recording head, in accordance with an aspect of the invention.

FIG. 4 is an elevation view of a transducer assembly in a recording head 112, in accordance with an aspect of this invention. The transducer assembly includes a waveguide 110 having a planar core layer 114 having generally parabolic sides or edges 116 and 118, shaped to reflect light, indicated by arrows 120, to a focal point 122 at or near the air bearing surface 124. The transducer assembly also includes a grating 126 that is positioned on the core layer 114 and used to couple light into the core layer 114. The light that impinges the gratings is shown as a spot 130. A reflective coating 132, which can be Au, is provided along the edges of the core layer. A return pole 134 is positioned adjacent to the air bearing surface 124.

Still referring to FIG. 4, a light source which may be, for example, a VCSEL as illustrated by box 136, can be placed directly over the grating 126. In one aspect, the light source, e.g. VCSEL 136, can be mounted or positioned adjacent to the waveguide 110 or it can be mounted directly on the core layer 144. While it will be appreciated that various types of light sources may be used with the invention, the description set forth herein will refer to a VCSEL for illustration purposes.

The VCSEL 136 can be mounted with respect to the grating plane to control the direction of the light that is coupled into the waveguide. It would be desirable to provide for collecting the light that couples into the waveguide in both directions. Therefore, in one aspect, the light emanating from the VCSEL 136 impinges upon the grating 126 at a grating normal incidence, i.e. the light from the VCSEL is normal or perpendicular to the grating surface.

As shown in FIG. 4, the grating 126 can be oriented such that a plurality of elongated slits or grooves 128 of the grating 126 is substantially parallel to a longitudinal axis A-A of the waveguide 110. This positioning of the grating 126 can allow for the light that impinges as spot 130 being directed in two directions, i.e. bidirectional, wherein each direction is substantially perpendicular to axis A-A, as indicated by arrows 120a. In one aspect, the longitudinal axis A-A of the waveguide 110 can extend through the focal point 122 of the waveguide.

FIG. 4 further illustrates turning mirrors 138 that are oriented angularly with respect to the longitudinal axis A-A of the waveguide 110. The turning mirrors 138 are positioned such that the light 120a from the grating 126 is directed as light 120 toward the parabolic sides or edges 116 and 118 of waveguide 110. It will be appreciated that the turning mirrors 138 can be flat or straight as shown in FIG. 4, or the turning mirrors may be curved, spherical, parabolic or the like as illustrated by dashed lines 138a. The choice of flat minors 138 or curved mirrors 138a may depend, for example, on if the mirror is to only turn the light or if it is to start the focusing process. In addition, a 180° phase shift between the right and left halves can be achieved (as is needed for some near-field transducers) by, for example, adjusting the location of the turning mirrors 138.

Figure 5:
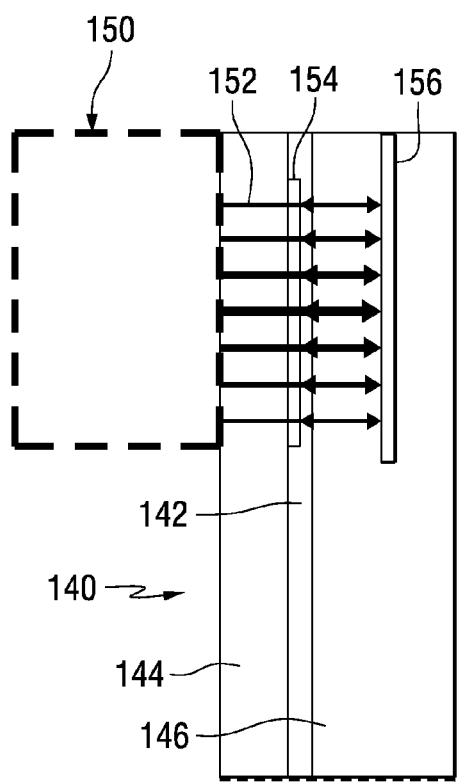
FIG. 5 is a side view of a waveguide and a light source, in accordance with an aspect of the invention.

FIG. 5 is a side view of a waveguide 140 and a light source, i.e., a VCSEL 150, in accordance with an aspect of the invention. The waveguide 140 is shown to have core layer 142 with cladding layers 144 and 146 on opposite sides of the core layer 142. The VCSEL 150 is mounted on the waveguide 140, e.g., the VCSEL 150 is mounted on a surface of the cladding layer 144. The VCSEL 150 emits light 152 that impinges upon the grating 154 in the core layer 142 at a normal incidence angle of 0°. The light 152 is directed from the grating 154 into the core layer 142 toward turning minors not shown in FIG. 5, but as described herein in FIG. 4. A flat or straight minor 156 may be positioned below or under the grating 154 to direct the light 152 not initially captured by the grating 154 back into the grating 154 so as to increase the overall coupling efficiency of the light into the waveguide 140. In this example, the mirror 156 lies in a plane substantially parallel to a plane containing the core layer 142.

Figure 6:
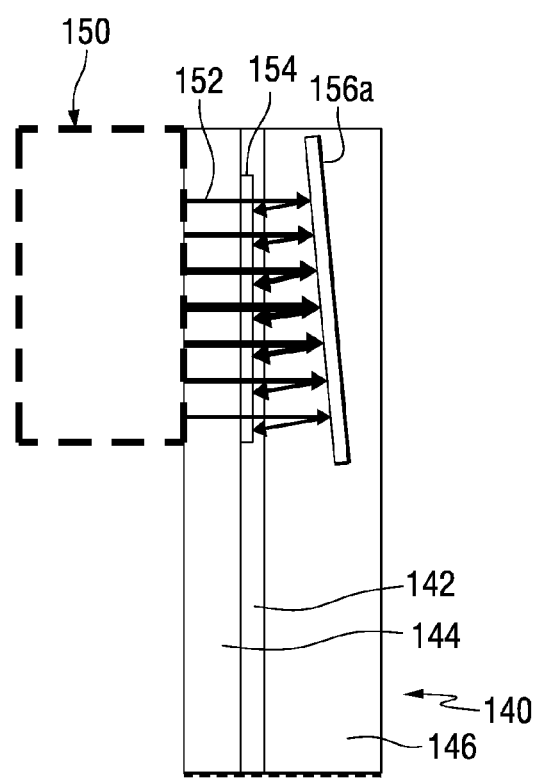
FIG. 6 is a side view of a waveguide and a light source, in accordance with another aspect of the invention.

FIG. 6 illustrates the waveguide 140 and light source, e.g., the VCSEL 150, similar to FIG. 5 except that minor 156a is formed at an angle or slope with respect to the grating 154. The sloped minor 156a also serves to direct the light 152 not initially captured by the grating 154 back into the grating 154 so as to increase the coupling efficiency of the light 152 into the waveguide 140.

Figure 7:
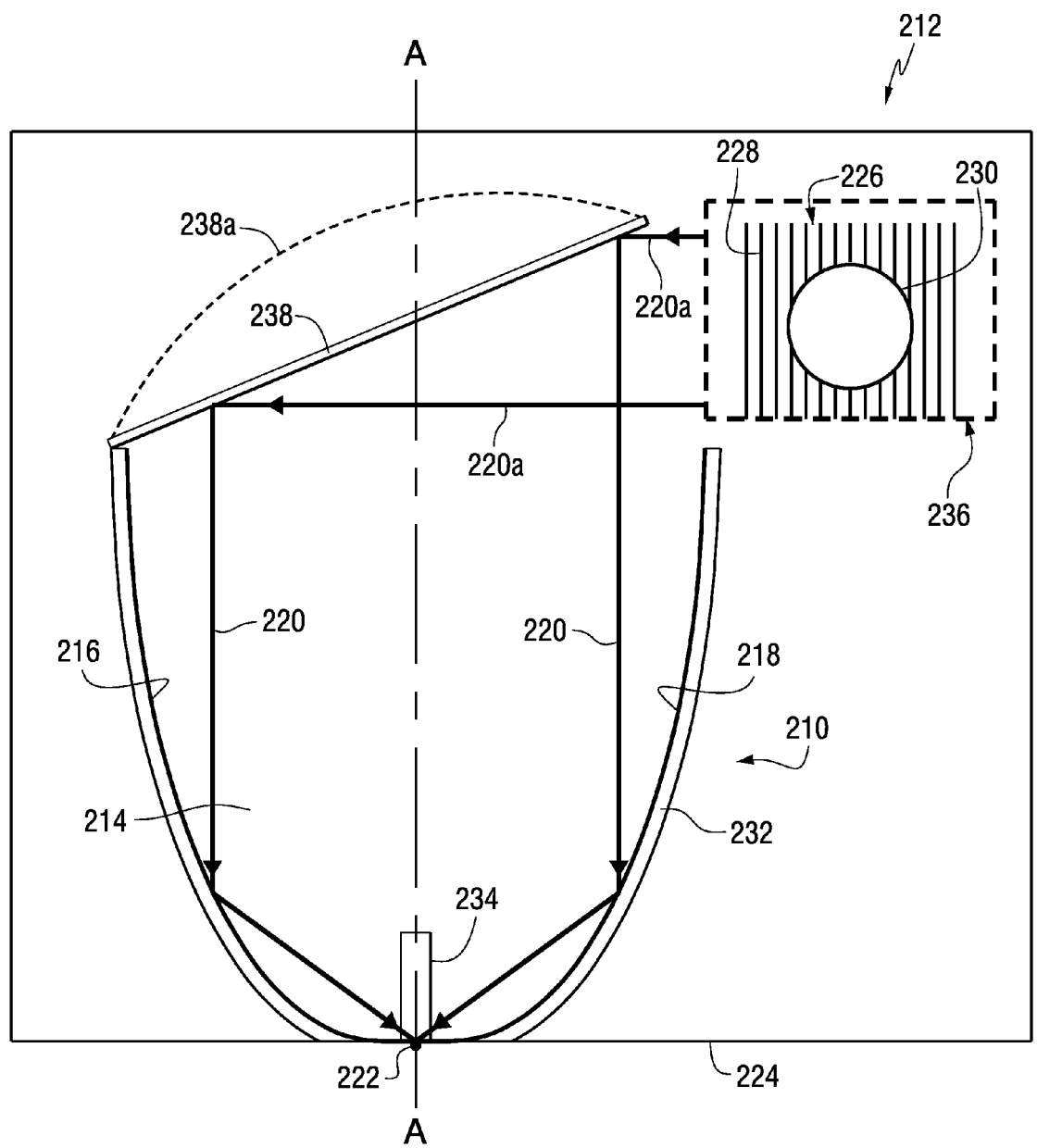
FIG. 7 is an elevation view of an additional waveguide in a recording head, in accordance with another aspect of the invention.

FIG. 7 is an elevation view of a waveguide 210 in a recording head 212, in accordance with another aspect of this invention. The waveguide 210 includes a planar core layer 214 having generally parabolic sides or edges 216 and 218, shaped to reflect light, indicated by arrows 220, to a focal point 222 at or near the air bearing surface 224. A grating 226 is positioned on the core layer 214 and used to couple light into the core layer 214. The light that impinges the grating 226 is shown as a spot 230. The waveguide 210 is similar in structure to the waveguide 110 shown in FIG. 4, except that in FIG. 7 the grating 226 is offset from the longitudinal axis A-A of the waveguide 210. It will be appreciated that the grating 226 may be offset from the longitudinal axis A-A at various other positions in accordance with aspects of the invention.

As also shown in FIG. 7, a reflective coating 232, which can be Au, is provided along the edges of the core layer 214. In addition, a return pole 234 is positioned adjacent to the air bearing surface 224.

Still referring to FIG. 7, a light source which may be, for example, a VCSEL can be placed directly over the grating 226, as illustrated by box 236. The VCSEL 236 can be mounted with respect to the grating plane to control the direction of the light that is coupled into the waveguide. In one aspect, the light emanating from the VCSEL 236 impinges upon the grating 226 at a grating normal incidence, i.e. the light from the VCSEL is normal or perpendicular to the grating surface.

In accordance with an aspect of the invention, FIG. 7 illustrates that the grating 226 is oriented such that a plurality of elongated slits or grooves 228 of the grating 226 is substantially parallel to the longitudinal axis A-A of the waveguide 210. This positioning of the grating 226 results in the light that impinges as spot 230 being directed in a direction that is substantially perpendicular to axis A-A, as indicated by arrows 220a.

FIG. 7 further illustrates a turning mirror 238 that is oriented angularly with respect to the longitudinal axis A-A of the waveguide 210. The turning mirror 238 is positioned such that the light 220a from the grating 226 is directed as light 220 toward the parabolic sides or edges 216 and 218 of waveguide 210. It will be appreciated that the turning mirror 238 can be flat or straight as shown in FIG. 7, or the turning mirror may be curved, spherical, parabolic or the like as illustrated by dashed lines 238a. The choice of a flat mirror 238 or a curved mirror 238a may depend, for example, on if the mirror is to only turn the light or if it is to start the focusing process. In addition, a 180° phase shift between the right and left halves can be achieved (as is needed for some near-field transducers) by, for example, adjusting the location of the turning mirrors.

The implementation described above and other implementations are within the scope of the following claims.

What is claimed is:

1. An apparatus, comprising:
   a transducer assembly including:
      a waveguide having first and second cladding layers and a core layer between the first and second cladding layers; and
      a grating structured to couple electromagnetic radiation into the waveguide, wherein the grating has a plurality of elongated slits that are substantially parallel to a longitudinal axis of the waveguide; and
      a light source mounted adjacent the waveguide to direct light onto the grating.

2. The apparatus of claim 1, wherein the light source comprises a vertical cavity surface emitting laser.

3. The apparatus of claim 1, wherein the longitudinal axis of the waveguide extends through a focal point of the waveguide and the grating is offset from the longitudinal axis.

4. The apparatus of claim 1, wherein the transducer assembly further includes a turning mirror positioned adjacent the grating for directing the electromagnetic radiation toward a side of the waveguide.

5. The apparatus of claim 4, wherein the turning mirror is oriented angularly with respect to the longitudinal axis of the waveguide.

6. The apparatus of claim 4, wherein the turning mirror is flat.

7. The apparatus of claim 4, wherein the turning mirror is curved, spherical, or parabolic.

8. The apparatus of claim 4, further including an additional turning mirror positioned on an opposing side of the grating for directing the electromagnetic radiation toward an opposing side of the waveguide.

9. The apparatus of claim 1, wherein the light source directs the light onto the grating at angle perpendicular to a surface of the grating.

10. The apparatus of claim 1, wherein the light source is mounted on the first cladding layer of the waveguide.

11. The apparatus of claim 10, wherein the waveguide further includes a mirror in the second cladding layer and adjacent the grating.

12. The apparatus of claim 10, wherein the waveguide further includes a mirror in the second cladding layer and adjacent the grating, wherein the minor is sloped with respect to the grating.

13. An apparatus, comprising:
   a transducer assembly including:
      a waveguide having first and second cladding layers and a core layer between the first and second cladding layers; and
      a grating structured to couple electromagnetic radiation into the waveguide, wherein the grating is oriented to direct light in a direction that is substantially perpendicular to a longitudinal axis of the waveguide; and
      a light source mounted adjacent the waveguide to direct light onto the grating.

14. The apparatus of claim 13, wherein the grating is oriented to direct light in another direction that is substantially perpendicular to the longitudinal axis of the waveguide.

15. The apparatus of claim 13, wherein the light source comprises a vertical cavity surface emitting laser.

16. The apparatus of claim 13, wherein the transducer assembly further includes a turning mirror positioned adjacent the grating for directing the electromagnetic radiation toward a side of the waveguide.

17. The apparatus of claim 16, wherein the turning minor is oriented angularly with respect to the longitudinal axis of the waveguide.

18. An apparatus, comprising:
   a data storage medium;
   a transducer assembly including:
      a waveguide having a core layer and a cladding layer adjacent the core layer; and
      a grating structured to couple electromagnetic radiation into the waveguide, wherein the grating has a plurality of elongated slits that are substantially parallel to a longitudinal axis of the waveguide;
   a light source mounted adjacent the waveguide to direct light onto the grating; and an arm for positioning the transducer assembly with respect to the data storage medium.

19. The apparatus of claim 18, wherein the light source comprises a vertical cavity surface emitting laser.

20. The apparatus of claim 18, wherein the transducer assembly further includes a turning mirror positioned adjacent the grating for directing the electromagnetic radiation toward a side of the waveguide.

* * * * *

UNITED STATES PATENT AND TRADEMARK OFFICE
CERTIFICATE OF CORRECTION

| | | |
|---|---|---|
| PATENT NO. | : 8,437,229 B2 | Page 1 of 1 |
| APPLICATION NO. | : 12/840371 | |
| DATED | : May 7, 2013 | |
| INVENTOR(S) | : Michael Allen Seigler | |

It is certified that error appears in the above-identified patent and that said Letters Patent is hereby corrected as shown below:

<u>In the Specification:</u>

Col. 4, line 19: "flat minors 138" should read --flat mirrors 138--.

Col. 4, line 35: "turning minors" should read --turning mirrors--.

Col. 4, line 37: "minor 156" should read --mirror 156--.

Col. 4, line 44: "that minor" should read --that mirror--.

Col. 4, line 46: "sloped minors" should read --sloped mirror--.

<u>In the Claims:</u>

Column 6, line 16, Claim 12: "the minor is" should read --the mirror is--.

Column 6, line 38, Claim 17: "turning minor is" should read --turning mirror is--.

Signed and Sealed this
Sixteenth Day of July, 2013

Teresa Stanek Rea
*Acting Director of the United States Patent and Trademark Office*